(12) United States Patent
Georgeson et al.

(10) Patent No.: US 8,691,383 B2
(45) Date of Patent: Apr. 8, 2014

(54) BLUNT IMPACT INDICATOR TAPE AND METHOD

(75) Inventors: Gary E. Georgeson, Federal Way, WA (US); William Joseph Tapia, Kapowsin, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 13/037,593

(22) Filed: Mar. 1, 2011

(65) Prior Publication Data

US 2012/0225294 A1 Sep. 6, 2012

(51) Int. Cl.
*B32B 5/16* (2006.01)
*B41M 5/20* (2006.01)

(52) U.S. Cl.
USPC ............ 428/402.2; 428/402.24; 428/143; 428/325; 503/201

(58) Field of Classification Search
USPC ............ 428/143, 325, 195, 402–402.24, 403, 428/404, 407; 427/389.9, 213.3–213.36, 427/483, 256; 264/534, 41, 4–4.7; 523/210, 523/205; 503/1
See application file for complete search history.

(56) References Cited

U.S. PATENT DOCUMENTS

| 7,647,809 | B1 | 1/2010 | Cooney |
| 2007/0197383 | A1* | 8/2007 | Koene et al. ................ 503/201 |
| 2008/0223152 | A1 | 9/2008 | Georgeson et al. |

FOREIGN PATENT DOCUMENTS

| EP | 538580 | 4/1993 |
| GB | 2194062 | 2/1988 |
| GB | 2194062 | * 2/1989 |
| WO | 0072055 | 11/2000 |

OTHER PUBLICATIONS

International Searching Authority, "International Search Report and Written Opinion", issued in connection with international application No. PCT/US2012/023127, May 18, 2012, (12 pages).
http://www.microteklabs.com.
Air Force SBIR/STTR Innovation, SBIR Topic #AF04-133, RX2008-127.

* cited by examiner

*Primary Examiner* — James J Seidleck
*Assistant Examiner* — S. Camilla Pourbohloul
(74) *Attorney, Agent, or Firm* — Hanley, Flight & Zimmerman, LLC

(57) ABSTRACT

A blunt impact indicator tape includes a tape strip, a plurality of rupture-able fluid microspheres carried by the tape strip and a colored indicator fluid in each of the plurality of fluid microspheres.

22 Claims, 3 Drawing Sheets

BLUNT IMPACT INDICATOR TAPE AND METHOD

TECHNICAL FIELD

The disclosure generally relates to techniques and methods of detecting application of impact to surfaces. More particularly, the disclosure relates to a blunt impact indicator tape and method in which a blunt impact indicator tape is placed on an impacting object or to an impacted surface to visually indicate and quantify blunt impact applied to the impacted surface.

BACKGROUND

On a flight line, an aircraft may be vulnerable to high energy blunt impacts (HEBI) from support vehicles and ground support equipment (GSE) such as cargo belt loaders, luggage carts, aircraft refuelers, catering vehicles, ground power units, airport buses and passenger boarding stairs. HEBIs may be particularly likely to occur as a result of the aircraft being impacted by a luggage cart, cargo container or other vehicle during loading or unloading of the aircraft. The challenge with on-aircraft HEBI incidents is the potential for impacts to the aircraft with no visible indication that an impacting event has occurred. Therefore, there is a need for a cost-effective means of determining when and where a HEBI has occurred so that proper non-destructive evaluation (NDE) of the impact area—and appropriate disposition—can be determined.

Accordingly, a blunt impact indicator tape and method in which a blunt impact indicator tape is placed on an impacting object or to an impacted surface to visually indicate and quantify blunt impact applied to the impacted surface is needed.

SUMMARY

The disclosure is generally directed to a blunt impact indicator tape which visually indicates and quantifies blunt impact applied to an impacted surface. An illustrative embodiment of the blunt impact indicator tape includes a tape strip, a plurality of rupture-able fluid microspheres carried by the tape strip and a colored indicator fluid in each of the plurality of fluid microspheres.

In some embodiments, the blunt impact indicator tape may include a tape strip; an adhesive layer on a first surface of the tape strip; an adhesive backing on a second surface of the tape strip; a plurality of rupture-able fluid microspheres carried by the adhesive layer on the tape strip; and a colored indicator fluid in each of the plurality of fluid microspheres.

The disclosure is further generally directed to a blunt impact indicator method. An illustrative embodiment of the blunt impact indicator method includes providing an indicator tape having a tape strip, a plurality of fluid microspheres on the tape strip and a colored indicator fluid in the plurality of fluid microspheres, respectively; placing the indicator tape on a first surface; and observing the indicator fluid on the first surface in the event of a collision between the first surface and a second surface.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to implement the disclosure and are not intended to limit the scope of the claims. Furthermore, there is no intention to be bound by any expressed or implied theory presented in the preceding technical field, background, brief summary or the following detailed description.

Figure 1:
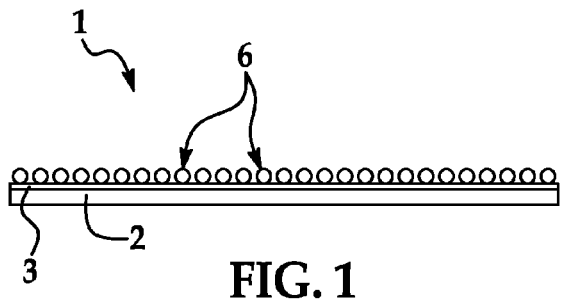
FIG. 1 is a side view of an illustrative embodiment of the blunt impact indicator tape.
Figure 2:
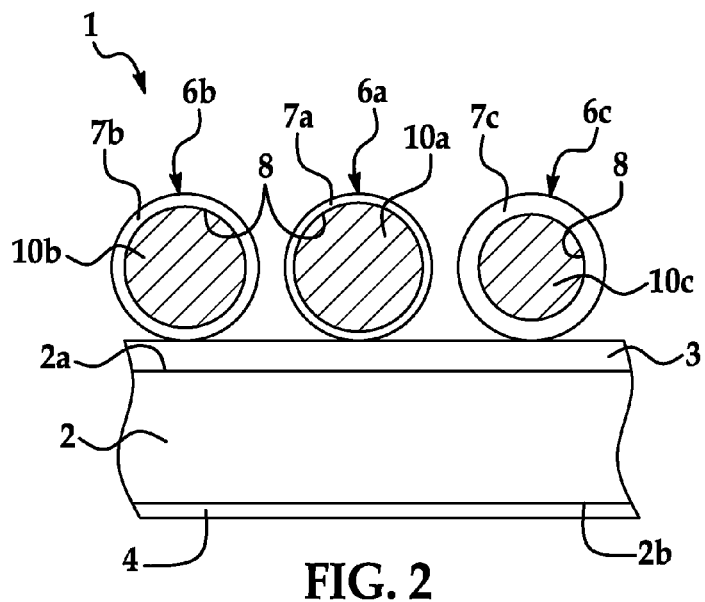
FIG. 2 is an enlarged sectional view of an illustrative embodiment of the blunt impact indicator tape.

Referring initially to FIGS. 1 and 2, an illustrative embodiment of the blunt impact indicator tape is generally indicated by reference numeral 1. The blunt impact indicator tape 1 may include a tape strip 2 having a sphere attachment surface 2a and an adhesive surface 2b, as shown in FIG. 2. An adhesive layer 3 may be provided on the sphere attachment surface 2a of the tape strip 2. An adhesive backing 4 may be provided on the adhesive surface 2b of the tape strip 2.

A closely-packed matrix of multiple fluid microspheres 6a, 6b and 6c may adhere to the adhesive layer 3. Each fluid microsphere 6a, 6b and 6c may have a generally spherical microsphere wall 7a, 7b and 7c, respectively, which may be a rupture-able material such as plastic, for example and without limitation. Each microsphere 6a, 6b and 6c may have a microsphere interior 8. An indicator fluid 10a, 10b and 10c may be contained in the microsphere interior 8 of each microsphere 6a, 6b and 6c, respectively. The indicator fluid 10a, 10b and 10c may be any suitable colored fluid including but not limited to paint or dye. Accordingly, upon rupture of the microsphere wall 7a, 7b or 7c of each fluid microsphere 6a, 6b or 6c, such as may occur in application of a high-energy blunt impact (HEBI) force to the fluid microsphere 6a, 6b or 6c, the indicator fluid 10a may bleed or leak from the corresponding ruptured fluid microsphere 6a, 6b or 6c for purposes which will be hereinafter described.

As shown in FIG. 2, in some embodiments, the fluid microspheres 6a, 6b and 6c may include a first set of fluid microspheres 6a; a second set of fluid microspheres 6b; and a third set of fluid microspheres 6c. The first, second and third sets of fluid microspheres 6a-6c may differ according to the blunt impact force which is required to rupture the microsphere wall 7a, 7b and 7c, respectively, of each fluid microsphere 6a, 6b and 6c in each fluid microsphere set 6a-6c. Accordingly, the magnitude of the blunt impact force which is required to rupture the microsphere wall 7a of each fluid microsphere 6a in the first set of fluid microspheres 6a may be less than the magnitude of the blunt impact force which is required to rupture the microsphere wall 7b of each fluid microsphere 6b in the second set of fluid microspheres 6b. Similarly, the magnitude of the blunt impact force which is required to rupture the microsphere wall 7b of each fluid microsphere 6b in the second set of fluid microspheres 6b may be less than the magnitude of the blunt impact force which is required to rupture the microsphere wall 7c of each fluid microsphere 6c in the third set of fluid microspheres 6c.

In some embodiments, variations in resistance of the microsphere walls 7a, 7b and 7c of the fluid microspheres 6a, 6b and 6c in the first, second and third microspheres 6a-6c to rupture may be accomplished by varying the thickness of the microsphere wall 7a, 7b and 7c of the fluid microspheres 6a, 6b and 6c in the respective fluid microsphere sets 6a-6c. Accordingly, as illustrated in FIG. 2, in some embodiments, the thickness of the microsphere wall 7a of each fluid microsphere 6a in the first set of fluid microspheres 6a may be less than the thickness of the microsphere wall 7b of each fluid microsphere 6b in the second set of fluid microspheres 6b. Similarly, the thickness of the microsphere wall 7b of each fluid microsphere 6b in the second set of fluid microspheres 6b may be less than the thickness of the microsphere wall 7c of each fluid microsphere 6c in the third set of fluid microspheres 6c. In other embodiments, variations in the ruptureability of the microsphere wall 7a, 7b and 7c of the fluid microspheres 6a, 6b and 6c in the first, second and third sets of fluid microspheres 6a-6c, respectively, may be accomplished using alternative methods or techniques known by those skilled in the art.

In some embodiments, the indicator fluid 10a, 10b and 10c in the microsphere interior 8 of the fluid microspheres 6a in the first set of fluid microspheres 6a, the fluid microspheres 6b in the second set of fluid microspheres 6b and the fluid microspheres 6c in the third set of fluid microspheres 6c may vary in color. Accordingly, the indicator fluid 10a in the fluid microspheres 6a of the first set of fluid microspheres 6a may be a first color; the indicator fluid 10b in the fluid microspheres 6b of the second set of fluid microspheres 6b may be a second color; and the indicator fluid 10c in the fluid microspheres 6c of the third set of fluid microspheres 6c may be a third color. In some embodiments, the indicator fluid 10a in the fluid microspheres 6a of the first set of fluid microspheres 6a may be green; the indicator fluid 10b in the fluid microspheres 6b of the second set of fluid microspheres 6b may be yellow; and the indicator fluid 10c in the fluid microspheres 6c of the third set of fluid microspheres 6c may be red. In other embodiments, alternative color schemes may be used.

In some embodiments, the fluid microspheres 6a, 6b and 6c of the first set of fluid microspheres 6a, the second set of fluid microspheres 6b and the third set of fluid microspheres 6c, respectively, may be randomly interspersed on the adhesive layer 3. In other embodiments, the fluid microspheres 6a, 6b and 6c of the first, second and third sets of fluid microspheres 6a-6c, respectively, may be arranged according to a selected order or pattern on the adhesive layer 3. Therefore, responsive to application of blunt impact forces of different magnitudes to the blunt impact indicator tape 1, the fluid microspheres 6a, 6b and 6c of the first, second and third sets of fluid microspheres 6a-6c may be designed to break or rupture and "bleed" or leak the indicator fluid 10a, 10b or 10c, respectively, onto a surface on which the blunt impact indicator tape 1 is placed. Thus, the leaked indicator fluid 10a, 10b or 10c may both mark the location and indicate the magnitude of the blunt impact force which was applied to the surface.

Figure 3:
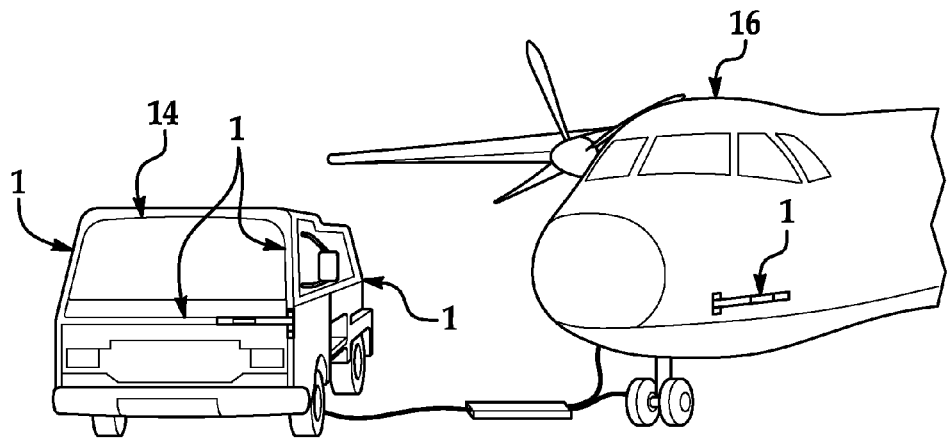
FIG. 3 is a front view of an aircraft operations support vehicle and an aircraft, with blunt impact indicator tape placed on the vehicle and the aircraft in exemplary application of the blunt impact indicator tape.

Referring next to FIG. 3, in exemplary application, the blunt impact indicator tape 1 may be placed on an airport operations support vehicle 14 which may accidentally strike an aircraft 16 or other structure on a flight line or other area during use of the airport operations support vehicle 14. As used herein, airport operations support vehicle 14 may be any type of vehicle or equipment which may be used to transport cargo, personnel or equipment on or around an aircraft 16. In some applications, the airport operations support vehicle 14 on which the blunt impact indicator tape 1 may be placed may be a cargo belt loader, a luggage cart, an aircraft re-fueler, a catering vehicle, a ground power unit, an airport bus or passenger boarding stairs, for example and without limitation. The blunt impact indicator tape 1 may be placed on an area or areas such as edges, corners and/or surfaces of the airport operations support vehicle 14 which may accidentally strike one or more areas on an aircraft 16 or other structure during operation or movement of the vehicle 14. In some applications, the blunt impact indicator tape 1 may be dispensed onto the airport operations support vehicle 14 or other equipment from a tape roll (not shown) and cut to the desired length. Although shown in FIG. 3, in some applications, the blunt impact indicator tape 1 may be omitted from the aircraft 16.

In the event that the airport operations support vehicle 14 accidentally strikes the aircraft 16 or other structure, at least a portion of the fluid microspheres 6a, 6b and 6c on the blunt impact indicator tape 1 may be ruptured if the magnitude of the blunt impact force which is applied to the blunt impact indicator tape 1 exceeds the minimum threshold of force required to rupture the fluid microspheres 6a, 6b and 6c. The ruptured fluid microspheres 6a, 6b and/or 6c "bleed" or release the indicator fluid 10a, 10b and/or 10c onto the surface of the aircraft 16 at the area on the aircraft 16 which is contacted by the airport operations support vehicle 14. Therefore, the indicator fluid 10a, 10b and/or 10c marks the location of the blunt impact which was applied to the aircraft 16. Maintenance and repair personnel can then easily notice and locate the area to which the blunt impact was applied by any of a variety of available nondestructive testing methods and assess the marked area for possible repair.

It will be appreciated by those skilled in the art that the blunt impact indicator tape 1 may indicate the magnitude of blunt impact force which is applied to the aircraft 16 depending on which fluid microspheres 6a, 6b and 6c of the first set of fluid microspheres 6a, the second set of fluid microspheres 6b and the third set of fluid microspheres 6c were ruptured. In the event that fluid microspheres 6a in the first set of fluid microspheres 6a are ruptured, the indicator fluid 10a which marks the location of the blunt impact force is a first color (such as green, for example and without limitation), indicating that the blunt impact was of relatively low magnitude. In the event that fluid microspheres 6b in the second set of fluid microspheres 6b are ruptured, the indicator fluid 10b which marks the location of the blunt impact is predominately a second color (such as yellow, for example and without limitation), indicating that the blunt impact force was of relatively higher magnitude. In the event that fluid microspheres 6c in the third set of fluid microspheres 6c are ruptured, the indicator fluid 10c which marks the location of the blunt impact is predominately a third color (such as red, for example and without limitation), indicating that the blunt impact force was of relatively high magnitude. Damage diagnostics and repair approaches may then be tailored depending on the magnitude of the blunt impact which is indicated by the color of the indicator fluid 10a, 10b or 10c leaked from the blunt impact indicator tape 1.

As further illustrated in FIG. 3, in some applications, the blunt impact indicator tape 1 may be additionally or alternatively placed on an area or areas of the aircraft 16 which may be accidentally struck by the airport operations support vehicle 14. In the event that the airport operations support vehicle 14 inadvertently strikes the aircraft 16, fluid microspheres 6a, 6b or 6c on the blunt impact indicator tape 1 rupture and leak or "bleed" the indicator fluid 10a, 10b or 10c onto the surface of the aircraft 16, marking the location and indicating the magnitude of the blunt impact force applied to the aircraft 16. In some applications, the blunt impact indicator tape 1 may be placed on both the airport operations support vehicle 14 and the aircraft 16. Accordingly, in the event that the airport operations support vehicle 14 inadvertently strikes the aircraft 16, the fluid microspheres 6a, 6b or 6c of the blunt impact indicator tape 1 on either or both of the airport operations support vehicle 14 and the aircraft 16 may rupture and indicate the point of contact between the airport operations support vehicle 14 and the aircraft 16.

Figure 4:
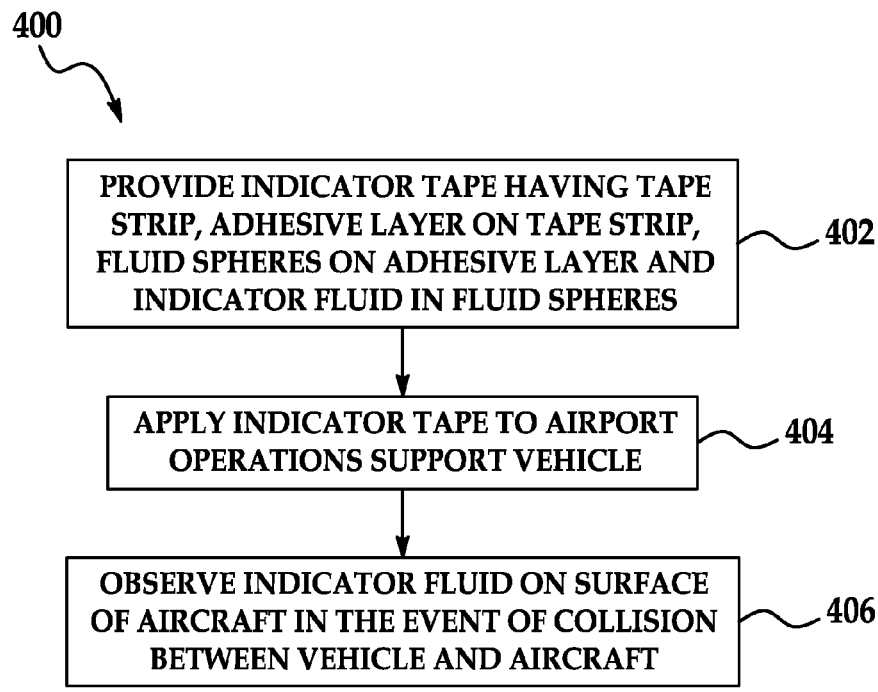
FIG. 4 is a flow diagram of an illustrative embodiment of a blunt impact indicator method.

Referring next to FIG. 4, a flow diagram 400 of an illustrative embodiment of a blunt impact indicator method is shown. In block 402, an indicator tape having a tape strip, an adhesive layer on the tape strip, fluid microspheres on the adhesive layer and an indicator fluid in each of the fluid microspheres is provided. In block 404, the indicator tape may be applied to an airport operations support vehicle. In block 406, the indicator fluid is observed on the surface of an aircraft or other structure in the event of a collision between the airport operations support vehicle and the aircraft or structure. Damage assessment and repair steps may then be taken.

Figure 5:
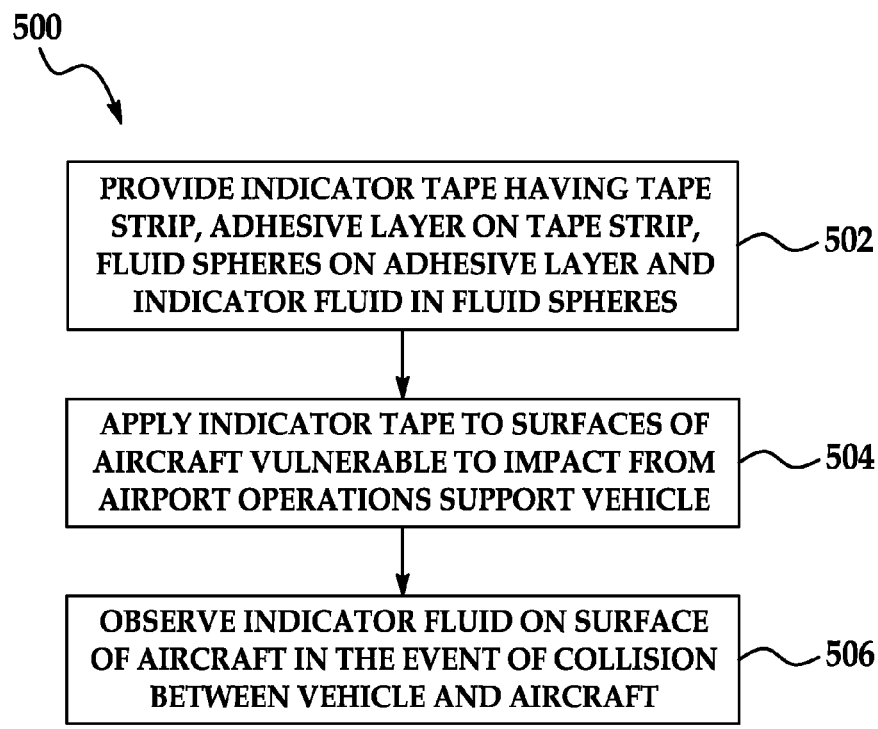
FIG. 5 is a flow diagram of an alternative illustrative embodiment of the blunt impact indicator method.

Referring next to FIG. 5, a flow diagram 500 of an alternative illustrative embodiment of a blunt impact indicator method is shown. In block 502, an indicator tape having a tape strip, an adhesive layer on the tape strip, fluid microspheres on the adhesive layer and an indicator fluid in each of the fluid microspheres is provided. In block 504, the indicator tape is applied to an aircraft or other structure which is vulnerable to impact from an airport operations support vehicle. In block 506, the indicator fluid is observed on the surface of the aircraft in the event of a collision between the airport operations support vehicle and the aircraft. Damage assessment and repair steps may then be taken.

Figure 6:
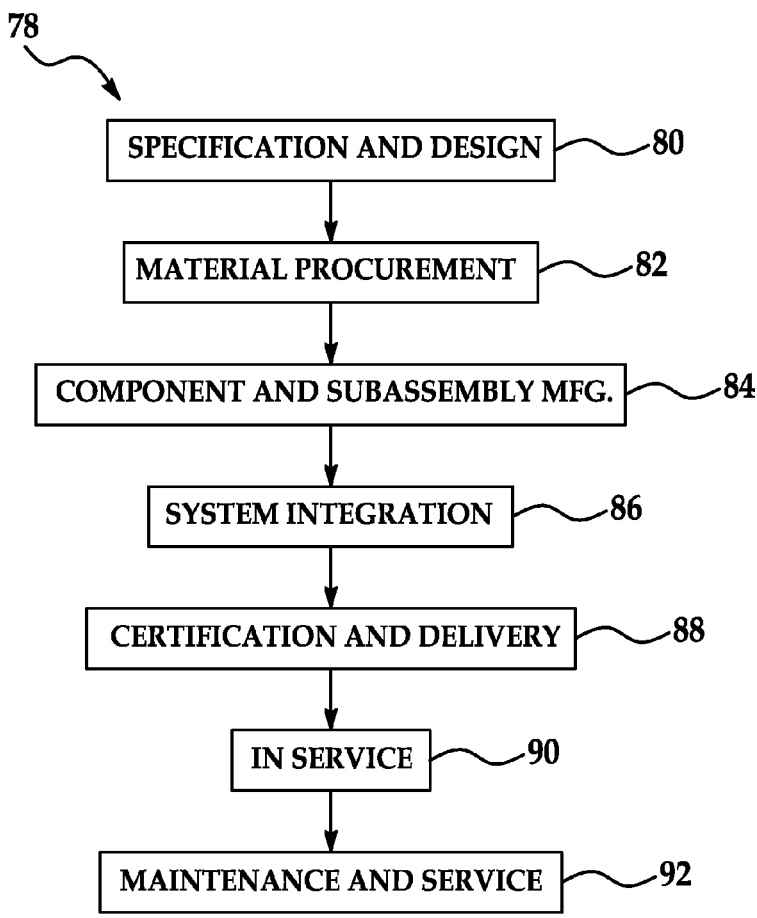
FIG. 6 is a flow diagram of an aircraft production and service methodology.
Figure 7:
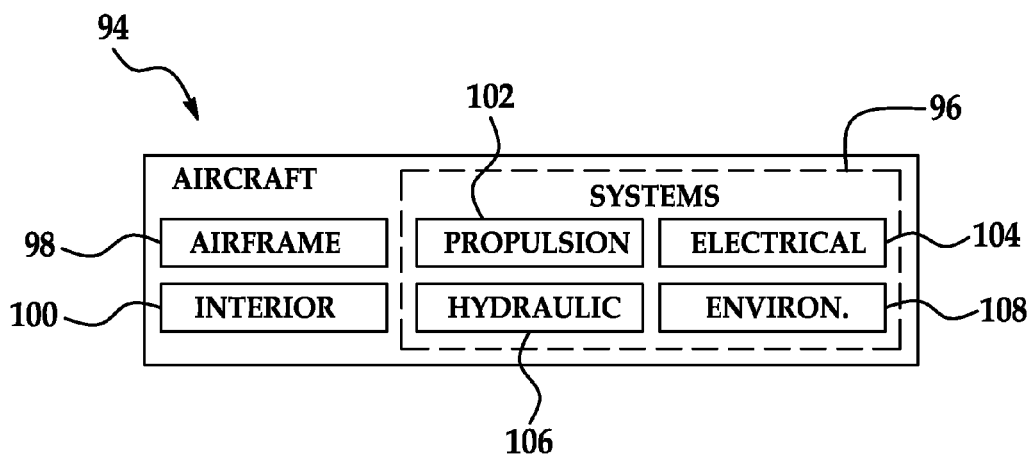
FIG. 7 is a block diagram of an aircraft.

Referring next to FIGS. 6 and 7, embodiments of the disclosure may be used in the context of an aircraft manufacturing and service method 78 as shown in FIG. 6 and an aircraft 94 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A blunt impact indicator tape, comprising:
a tape strip comprising an adhesive layer on a first side of the tape strip;
a plurality of rupturable fluid microspheres adhered to the adhesive layer, the plurality of rupturable fluid microspheres being exposed; and
a colored indicator fluid in each of said plurality of fluid microspheres.

2. The blunt impact indicator tape of claim 1 wherein said colored indicator fluid comprises paint.

3. The blunt impact indicator tape of claim 1 wherein said colored indicator fluid comprises a dye.

4. The blunt impact indicator tape of claim 1 wherein first ones of said fluid microspheres require a higher magnitude of blunt impact force to rupture than is required to rupture second ones of said fluid microspheres.

5. The blunt impact indicator tape of claim 4 wherein said colored indicator fluid in the first ones of said fluid microspheres is a different color than said colored indicator fluid in the second ones of said fluid microspheres.

6. The blunt impact indicator tape of claim 1 wherein said fluid microspheres comprise a plurality of sets of fluid microspheres which vary according to magnitude of blunt impact force required to rupture said fluid microspheres.

7. The blunt impact indicator tape of claim 6 wherein said plurality of sets of fluid microspheres comprises a first set of fluid microspheres having an indicator fluid of first color, a second set of fluid microspheres having an indicator fluid of second color and a third set of fluid microspheres having an indicator fluid of third color.

8. The blunt impact indicator tape of claim 7 wherein said first color is green, said second color is yellow and said third color is red.

9. A blunt impact indicator tape, comprising:
a tape strip;
an adhesive layer on a first surface of said tape strip;
an adhesive backing on a second surface of said tape strip;
a plurality of rupturable fluid microspheres adhered to said adhesive layer on said tape strip, the plurality of rupturable fluid microspheres being exposed; and
a colored indicator fluid in each of said plurality of fluid microspheres.

10. The blunt impact indicator tape of claim 9 wherein said colored indicator fluid comprises paint.

11. The blunt impact indicator tape of claim 9 wherein said colored indicator fluid comprises a dye.

12. The blunt impact indicator tape of claim 9 wherein said fluid microspheres vary according to magnitude of blunt impact force required to rupture said fluid microspheres.

13. The blunt impact indicator tape of claim 12 wherein said colored indicator fluid in said fluid microspheres is one of various colors.

14. The blunt impact indicator tape of claim 12 wherein said fluid microspheres comprise a plurality of sets of fluid microspheres which vary according to magnitude of blunt impact force required to rupture said fluid microspheres.

15. The blunt impact indicator tape of claim 14 wherein said plurality of sets of fluid microspheres comprises a first set of fluid microspheres having an indicator fluid of first color, a second set of fluid microspheres having an indicator fluid of second color and a third set of fluid microspheres having an indicator fluid of third color.

16. The blunt impact indicator tape of claim 15 wherein said first color is green, said second color is yellow and said third color is red.

17. A blunt impact indicator method, comprising:
  providing an indicator tape having a tape strip, an adhesive layer on a first side of the tape strip, a plurality of rupturable fluid microspheres adhered to the adhesive layer, the plurality of rupturable fluid microspheres being exposed, and a colored indicator fluid in said plurality of fluid microspheres, respectively; and
  placing said indicator tape on at least one of a first surface and a second surface.

18. The blunt impact indicator method of claim 17 wherein said first surface comprises at least one surface on an airport operations support vehicle and said second surface comprises at least one surface on an aircraft.

19. The blunt impact indicator method of claim 17 wherein said placing said indicator tape on at least one of a first surface and a second surface comprises placing said indicator tape on said first surface and said second surface.

20. The blunt impact indicator method of claim 17 wherein said providing an indicator tape having a tape strip, a plurality of fluid microspheres on said tape strip and a colored indicator fluid in said plurality of fluid microspheres, respectively, comprises providing an indicator tape having a tape strip, a plurality of sets of fluid microspheres which vary according to magnitude of blunt impact force required to rupture said fluid microspheres on said tape strip, and indicator fluid of various colors in said plurality of sets of fluid microspheres, respectively.

21. The blunt impact indicator tape of claim 9, wherein the plurality of rupturable fluid microspheres are arranged on the adhesive layer according to a pattern.

22. The blunt impact indicator tape of claim 1, wherein the rupturable fluid microspheres are configured to mark with the colored indicator fluid each of the surfaces that are a party to an impact that causes at least a portion of the rupturable fluid microspheres to rupture.

\* \* \* \* \*